United States Patent [19]
Beyers

[11] 3,952,825
[45] Apr. 27, 1976

[54] HYDRAULIC STEERING SYSTEM FOR ARTICULATED VEHICLES

[75] Inventor: Marvin Edward Beyers, Peoria, Ill.

[73] Assignee: Caterpillar Tractor Co., Peoria, Ill.

[22] Filed: July 7, 1975

[21] Appl. No.: 593,593

[52] U.S. Cl. .............................. 180/139; 91/388; 91/411 R
[51] Int. Cl.² ........................................ B62D 5/06
[58] Field of Search .................. 180/79.2 B; 91/388, 91/411 R; 60/464, 420, 461

[56] References Cited
UNITED STATES PATENTS

| | | | |
|---|---|---|---|
| 2,331,026 | 10/1943 | Harrington | 60/461 |
| 2,431,032 | 11/1947 | Ernst | 60/420 |
| 3,444,948 | 5/1969 | Bianchetta et al. | 180/79.2 B |
| 3,795,177 | 3/1974 | Cryder | 91/411 R |

Primary Examiner—M. H. Wood, Jr.
Assistant Examiner—John A. Pekar
Attorney, Agent, or Firm—Wegner, Stellman, McCord, Wiles & Wood

[57] ABSTRACT

A wheeled vehicle which has two members connected by an upright joint has a pair of hydraulic steering jacks coupled between the members on opposite sides of the joint, and the vehicle is steered by normally causing both jacks to pivot the members under the control of a steering wheel. The hydraulic steering system utilizes a constant displacement pump driven by the vehicle engine, and includes a follow-up means which senses the pivoting movement and deactivates the jacks when turning of the steering wheel ceases, so the operator may steer the vehicle by manipulating the wheel in a conventional manner. Selector valve means in the hydraulic system functions to automatically direct all or nearly all of the fluid to one jack if pump output is insufficient to drive both jacks as fast as is called for by the operator's rotation of the steering wheel.

14 Claims, 2 Drawing Figures

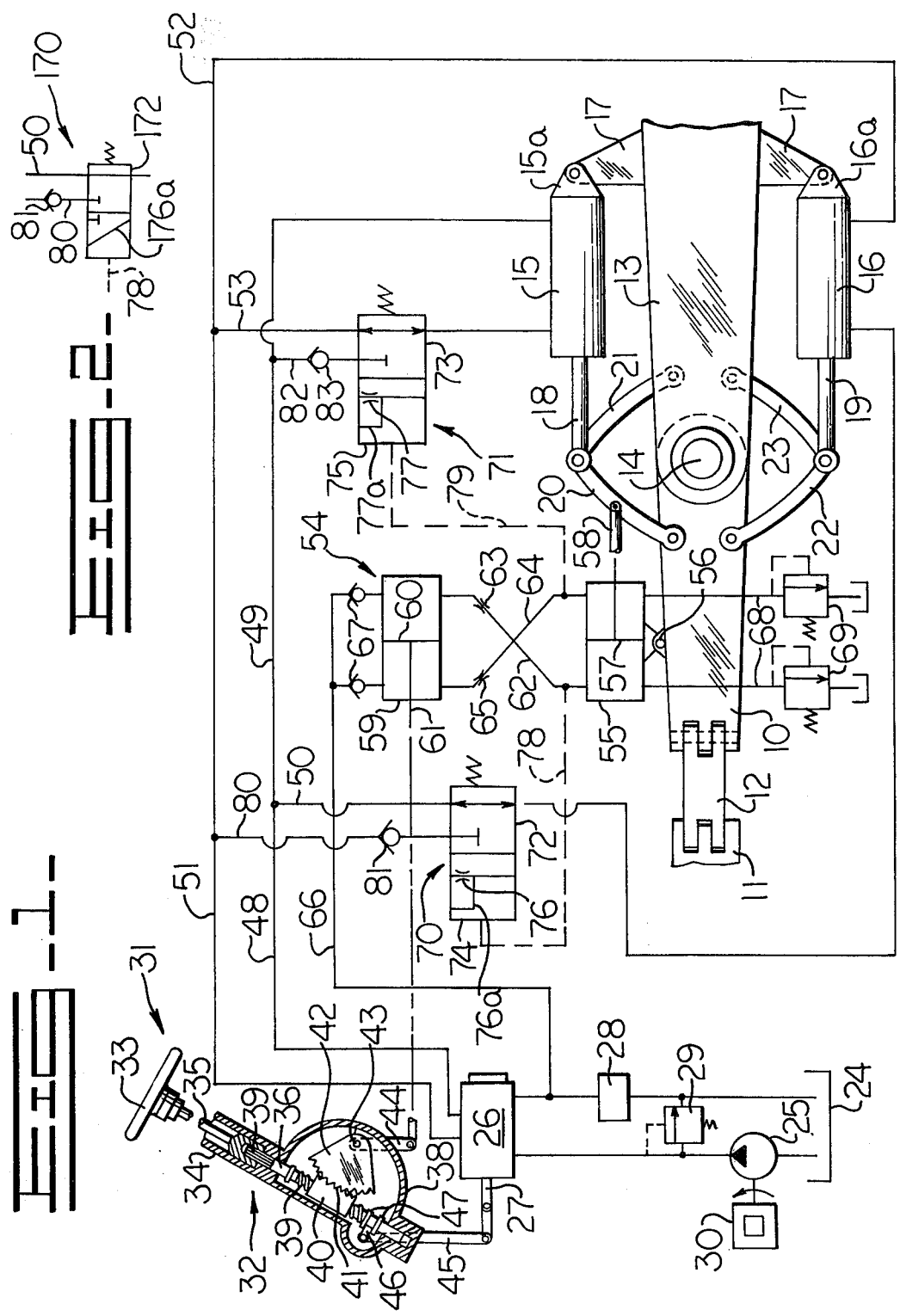

HYDRAULIC STEERING SYSTEM FOR ARTICULATED VEHICLES

BACKGROUND OF THE INVENTION

Certain vehicles, such as loaders and scrapers, have two wheeled body members connected by an upright joint. Such vehicles are most efficiently steered by causing relative pivotal movement of the two body members about the joint; and conveniently such relative pivotal movement is provided by a hydraulic steering system under the control of a steering wheel on one of the body members. The system includes a pair of hydraulic jacks coupled between the members on opposite sides of the joint, and steering is accomplished by extending one jack while simultaneously retracting the other jack. The hydraulic system commonly includes a constant displacement pump driven by the vehicle engine, a three-position control valve and a control element operable by rotation of the steering wheel for moving the control valve between a neutral position and two offset positions for simultaneously extending one jack and retracting the other as heretofore described.

In accordance with U.S. Pat. No. 3,444,948, such hydraulic steering systems may be provided with a follow-up means which permits them to be steered by conventional manipulation of the steering wheel. The follow-up means disclosed and claimed in U.S. Pat. No. 3,444,948 utilizes a master cylinder coupled between the wheeled members for detecting pivoting at the joint, together with a slave cylinder which is hydraulically connected to the master cylinder for synchronized movement therewith, and a coupling between the slave cylinder and the valve control element to move said element in a direction opposite to that produced by turning of the steering wheel. With the follow-up system of U.S. Pat. No. 3,444,949, when the operator has turned the steering wheel a certain distance and then stopped turning the wheel, the follow-up system acts to return the three-position control valve to its neutral position so that the turning radius remains constant until the operator rotates the steering wheel farther in the same direction or else rotates it in the opposite direction.

Even with the above described follow-up system, there is a problem in the steering of vehicles of the herein described type. The constant displacement hydraulic pump is driven directly by the vehicle engine, so that pump output depends upon engine speed. At low engine speeds, as for example, when the vehicle is descending a grade with the engine being driven by the wheels, the pump output may be insufficient to drive the two hydraulic jacks as rapidly as is called for by the operator's rate of rotating the steering wheel. This can create a dangerous condition, because in such a steering system the speed with which the vehicle can achieve the aspect required for a particular turning radius depends upon how fast the pistons of the steering jacks can move.

Theoretically, it is possible to eliminate the problem by a fluid delivery system in which the pump has a constant output regardless of the speed at which it is driven; but that solution is not feasible because of its complexity and high cost.

SUMMARY OF THE INVENTION

The principal object of the present invention is to obviate the difficulties which may be encountered in a hydraulic steering system of the described type which result from the need to make a relatively rapid turn when the vehicle is traveling at low engine speed.

Another object of the invention is to provide a simple and inexpensive modification of a hydraulic steering system which eliminates the described problem.

The solution to the problem is achieved by using selector valve means in the hydraulic system which functions to automatically direct the entire fluid flow to one of the two steering jacks if pump output is insufficient to drive both jacks as fast as is called for by the operator's rotation of the steering wheel. Specifically, the selector valve means comprises a selector valve which is hydraulically connected to the rod end of each steering jack, and which is operated by pilot presssure derived from the slave cylinder of the follow-up means. When the hydraulic system is incapable of driving the two steering jacks as fast as is required by the rate of rotation of the steering wheel, a back pressure is created upon the slave cylinder, and this back pressure is used as a pilot pressure to close the selector valve which is hydraulically connected to the rod end of the steering jack that is under pressure at the time. This automatically directs the entire flow of fluid to the head end of the other jack which permits the piston of said other jack to be driven at nearly twice the rate that was possible when the volume of fluid flow was split between the two jacks.

In one embodiment of the system, each of the selector valves includes a valve element that contains a flow restriction; and operation of the selector valve in response to pilot pressure causes flow to be through the restricting valve element so that a small volume of fluid under pressure continues to flow to the rod end of the idle jack to give a slight steering boost and prevent cavitation behind the piston of the idle jack. There is also a line from the rod end of the active jack to the rod end of the idle jack, through the selector valve, so that fluid expelled from the active jack may furnish anti-cavitation makeup fluid in case the quantity passing through the restriction is insufficient.

In a second embodiment the valve element with the flow restriction is omitted from the selector valves; and anti-cavitation fluid is supplied to the idle jack only from the rod end of the active jack.

The first embodiment is preferred because the steering boost by the idle jack is advantageous when a vehicle of this type is stuck in heavy mud. If the wheels are driving in low gear at high engine speed the steering system operates in the usual way—i.e., with both jacks providing output for steering. However, under certain conditions the steering articulation is useful to wiggle the wheels to an area where there is better traction, and it may be necessary to do this with the engine speed too low for the hydraulic system to keep up with the need to articulate the vehicle. The operator turns the steering wheel faster than the jacks can articulate the vehicle, and the selector valve means acts to put the entire fluid flow to one jack which still applies optimum force because the vehicle cannot articulate fast enough. The steering boost to the idle jack then affords higher steering force.

THE DRAWINGS

FIG. 1 is a schematic view of a hydraulic steering system embodying the invention; and FIG. 2 is a view of an alternative form of selector valve for use in said system.

DETAILED DESCRIPTION OF THE INVENTION

Referring now to FIG. 1, 10 indicates a rear portion of a tractor which is connected to a forward tractor portion 11 through a cushioned hitch 12; and 13 is a gooseneck of a scraper which is pivotally connected to the rearward portion 10 of the tractor through a kingpin 14 which affords an upright joint between the two articulated members of the vehicle body. For a full side elevational view of a vehicle of the type here involved, reference is made to U.S. Pat. No. 3,311,389.

Pivoting of the members 10 and 13 about the joint 14 for steering purposes is accomplished by a pair of double acting hydraulic jacks 15 and 16 which have their respective head end 15a and 16a pivotally connected to laterallly extending mounting brackets 17 on the gooseneck 13. The piston rods 18 and 19 of the jacks 15 and 16 are pivotally connected to respective sets of steering links 20 and 21, and 22 and 23; with the links 20 and 21 connected, respectively, to the vehicle members 10 and 13 at one side of the joint 14, while the steering links 22 and 23 are connected, respectively, to the vehicle members 10 and 13 at the opposite side of the joint 14. Thus, extension of one of the steering jacks 15 or 16 accompanied by retraction of the other of said jacks will pivot members 13 relative to member 10 in a first direction, while reverse motion of the jacks will pivot member 13 in the opposite direction.

To control the jacks 15 and 16 and thereby steer the vehicle, a high pressure hydraulic fluid such as oil is selectively supplied to the jacks from a reservoir 24 by a constant displacement pump 25 coupled to the intake of a steering control valve 26. The valve 26 is conveniently of the general type disclosed in U.S. Pat. No. 3,154,921, which has a control element 27 that may be moved axially between a neutral position and two offset positions. At the neutral position, the oil supplied to the valve 26 by the pump 25 is returned directly to the reservoir 24 through a valve 28 of the class which maintains a constant predetermined pressure at its inlet side. For safety purposes there is a pilot controlled pressure relief valve 29 in the hydraulic line that connects the pump 25 to the control valve 26.

The constant displacement pump 25 is mechanically driven by the vehicle engine which is ordinarily an internal combustion engine 30 as illustrated. Thus, pump speed and pump output depend upon the speed at which the vehicle engine 30 is being driven so that the volume of fluid delivered to the steering control valve 26 varies with changes in engine speed.

The valve control element 27 of the three position valve 26 is operated from a control structure of the type disclosed in U.S. Pat. No. 3,444,948. That structure, which is indicated generally at 31, includes a steering column assembly, indicated generally at 32, which provides a connecting structure between a steering wheel 33 and the valve control element 27. The steering column assembly 32 includes a hollow housing 34 and a steering shaft 35 within the housing which has the steering wheel 33 mounted upon its upper end. A lower shaft 36 is coaxial with the shaft 35 and is coupled to it through a splined connection 37 which makes the lower shaft 36 capable of being rotated by turning the wheel 33 while at the same time it may move axially with reference to the shaft 35.

The hollow housing 34 has an enlarged chamber 38, and within the chamber the lower shaft 36 is provided with a thread 39 on which an internally threaded sleeve 40 is mounted. The sleeve 40 is provided with a gear rack 41; and a gear sector 42 engaged with the rack has a shaft 43 by which it is pivotally mounted in the chamber 38. An arm 44 on the shaft 43 extends generally downwardly through an opening in the wall of the housing enlargement 38. Thus, if the gear sector 42 is held in a fixed position the sleeve 40 is held stationary, and turning of the steering wheel 33 acts to move the lower shaft 36 axially within the housing 34, with the direction of shaft movement being dependent upon the direction in which the steering wheel 33 is turned. Such axial movement of the shaft 36 is transmitted to the steering valve control member 27 by a link 45 which has a fork 46 that is pivoted within the enlarged portion of the housing 34 and engages the lower portion of the shaft 36 between a pair of flanges 47 on said shaft. When the steering wheel 33 is in its normal position, the steering control valve 26 is held in its neutral position, while rotation of the steering wheel 33 moves the valve control member 27 either inwardly or outwardly, depending upon the direction of rotation of the steering wheel.

When the steering valve control element 27 is moved outwardly, a spool (not shown) of the control valve 26 moves to open a first hydraulic conduit 48 to receive oil under pressure from the pump 25; and the conduit 48 has a first branch 49 to the head end 15a of the steering jack 15 and a second branch 50 to the rod end of the steering jack 16.

When the steering control member 27 is moved inwardly from the neutral position it opens a conduit 51 to receive oil under pressure from the constant displacement pump 25; and the conduit 51 has a first branch 52 to the head end 16a of the jack 16 and a second branch 53 to the rod end of the steering jack 15.

The entire system as heretofore described is in accordance with U.S. Pat. No. 3,444,948, as is also a follow-up system, indicated generally at 54. The follow-up system includes a master cylinder 55 which is pivotally mounted on bosses 56 on the tractor portion 10 and which has a piston 57, the rod 58 of which is pivotally connected to the steering link 20. Thus, the piston 57 of the master cylinder 55 is moved toward the rod end of the master cylinder when pressure is applied to the head end of the jack 15 and to the rod end of the jack 16; while opposite movement of the jacks 15 and 16 moves the master piston 57 toward the head end of the cylinder 55.

A slave cylinder 59 has a piston 60 which is mounted in proximity to the mechanical steering assembly 31, and the slave cylinder piston rod 61 is pivotally connected to the arm 44 of the sector shaft 43. The head end of the master cylinder 55 is connected by a conduit 62 with the head end of the slave cylinder 59 through a restriction 63; while the rod end of the master cylinder 55 is connected with the rod end of the slave cylinder 59 through a conduit 64 that has a restriction 65.

As described in U.S. Pat. No. 3,444,948, the follow-up system 54 functions to detect pivoting motion about joint 14 and to feed this motion back to the steering valve control element 27 in such a way as to tend to restore the valve 26 to its neutral position. As long as the steering wheel 33 continues to be turned, the follow-up system 54 cannot return the valve 26 to its neutral position because such turning of the steering wheel is continually opening the valve 26, and that is a precondition to operation of the follow-up system. However, as soon as the steering wheel 33 is no longer being turned, the follow-up system 54 can return the steering control valve 26 to its neutral position.

Oil from the reservoir 24 is provided to both ends of the slave cylinder 59 through a conduit 66 from which branches feed the two ends of the slave cylinder through check valves 67. Oil is supplied to the master cylinder 55 through the conduits 62 and 64; and both ends of the master cylinder are provided with relief lines 68 that have separate pilot operated pressure relief valves 69.

Extension of the slave piston 60 acts through the link 44, the sector 42, and the sleeve 40 to lift the axially movable steering shaft 36; and similarly, retraction of the slave piston 60 tends to lower the shaft 36. Each of the foregoing motions occur only when the operator is not turning the steering wheel 33. Thus, the master cylinder 55 detects pivoting at the joint 14, and the synchronized slave cylinder is coupled to the valve control member 27 to move that member in a direction opposite to that produced by turning of the steering wheel.

The improvement to the above described steering system of U.S. Pat. No. 3,444,948 is the subject of the present patent application. It consists of a first pilot operated selector valve, indicated generally at 70; and a second pilot operated selector valve, indicated generally at 71. Thus, the two selector valves 70 and 71, collectively, form selector valve means.

The selector valve 70 includes a normally open valve member 72 in the branch conduit 50 to the rod end of the steering jack 16; while the selector valve 71 includes a normally open valve member 73 in the branch conduit 53 to the rod end of the steering jack 15. The selector valves 70 and 71 also include normally closed valve elements which are indicated, respectively, at 74 and 75; and said normally closed valve elements include flow restrictions 76 and 77, respectively, and by-pass passages 76a and 77a. The selector valves are both pilot operated, with a pilot connection 78 for the valve 70 which senses pressure at the head end of the slave cylinder 59 by a connection to the conduit 62 between the master cylinder and the restriction 63; while a pilot connection 79 for the selector valve 71 senses pressure at the rod end of the slave cylinder 59 through a connection to the conduit 64 between the master cylinder 55 and the restriction 65.

The pilot connections 78 and 79 sense back pressure upon the slave piston 60, and such back pressure is produced when the volume of oil delivered by the pump 25 is insufficient to move the pistons of the steering jacks 15 and 16 as rapidly as is required by the rate of rotation of the steering wheel 33 by the operator. Such a condition can occur when the vehicle engine 30 is operating at low speed, so that the constant displacement pump 25 is being driven at a low speed, and when the steering wheel 33 is turned rapidly by the operator, thus calling for a large volume of oil to the jacks 15 and 16 in order to effect the requisite steering displacement of the vehicle members 10 and 13 about the joint 14.

Under such conditions, the master piston 57 and the slave piston 60 are displaced at a rate which does not permit the sleeve 40 and the sector 42 to keep up with the axial motion of the rod 36. Depending upon the direction in which the steering wheel 33 is being turned, the mechanical connection through the arm 44 produces a back pressure on the slave piston 60 which acts in a direction opposite to that in which the slave piston is being moved in conjunction with the master piston. Such back pressure acts through the pilot connection 78 or 79, as the case may be, to close either the branch conduit 50 or the branch conduit 53.

When the head end of the steering jack 15 and the rod end of the steering jack 16 are under the pressure of steering fluid, back pressure upon the slave piston 60 closes the normally open valve member 72 and opens the valve element 74. Oil from the pressure conduit 51 is then delivered to the rod end of the jack 16 only through the flow restriction 76, so that substantially all the oil delivered by the pump goes to the head end of the jack 15. Conversely, when oil is being delivered to the head end of the jack 16 and to the rod end of the jack 15, the back pressure upon the slave piston 60 acts through the pilot connection 79 to close the valve member 73 and permit flow of oil to the rod end of the jack 15 only through the restriction 77 so that substantially all oil from the pump is delivered to the head end of the jack 16.

The flow of oil through the restrictions 76 and 77 is so small that it may permit cavitation behind the idling jack piston; and to prevent this the by-pass passages 76a and 77a are provided. When selector valve 70 is actuated, the passage 76a connects a make-up line 80 from the conduit 51, through a check valve 81 to the rod end of jack 16. Thus, some of the oil expelled from the rod end of the jack 15 does not return to the reservoir 24 through the valve 28 but instead passes through the line 80 to the rod end of the jack 16.

Conversely, when the head end of the jack 16 is under pressure and the jack 15 is idling, the by-pass passage 77a opens a line 82 from the conduit 49 through a check valve 83 to the rod end of the jack 15 so that oil expelled from the rod end of the jack 16 furnishes make-up oil to the rod end of the jack 15.

FIG. 2 illustrates an alternative form of selector valve 170 which may be used in place of the selector valve 70 or the selector valve 71. It differs from the valves 70 and 71 in that it has no parts corresponding to the flow restrictions 76 and 77 of the selector valves 74 and 75.

As illustrated in FIG. 2, the valve 170 has a normally open valve member 172 in the pressure line 50 to the rod end of the jack 16. It has a bypass passage 176a which connects the rod end of the jack 15 to the rod end of the jack 16 through the line 80 and check valve 81 so as to supply makeup oil to the rod end of the jack 16 when the jack 15 is active and the jack 16 is idle. The valve 170 is pilot operated by means of a line 78.

Accordingly, in a system using the valve of FIG. 2, there is no fluid from the pump delivered to the rod end of the idle jack. Otherwise the system functions the same whether it is supplied with the valve 70 or the valve 170.

The foregoing detailed description is given for clearness of understanding only and no unnecessary limitations should be understood therefrom, as modifications will be obvious to those skilled in the art.

I claim:

1. In a wheeled vehicle having two members connected by an upright joint about which the members pivot for steering the vehicle, a steering wheel on one of said members, a hydraulic system including two fluid operated jacks coupled between said members on opposite sides of the joint for effecting said pivoting, each of said jacks having a head end and a rod end provided with fluid connections, a constant displacement hydraulic pump in said system which is driven from the vehicle engine, a three position control valve in said system, a valve control element operable by rotation of the steering wheel for moving said control valve between a neutral position and two offset positions for simultaneously driving both jacks to pivot the members in a desired direction, and follow-up means in said system which includes a master cylinder coupled between the wheeled members for detecting pivoting at the joint, together with a slave cylinder hydraulically connected to the master cylinder for synchronized movement therewith, said slave cylinder being coupled to the valve control element to move said element in a direction opposite to that produced by turning of the steering wheel, the improvement comprising:

means for sensing back pressure in the system resulting from insufficient fluid volume for driving the jacks and followup system as rapidly as is required by the speed of steering wheel rotation;

selector valve means which has a normal position, said selector valve means being movable from said normal position in response to the sensing of back pressure by said sensing means;

and fluid connections between said selector valve means, the control valve, and the jacks to selectively direct substantially the entire flow of fluid from the pump to one of the two jacks, which is then an active jack, upon movement of the selector valve means from said normal position, while the other of said jacks is substantially idle.

2. The improvement of claim 1 in which the selector valve means is pilot operated, and the means for sensing back pressure includes a pilot connection between the selector valve means and the slave cylinder.

3. The improvement of claim 2 in which the selector valve means includes two selector valves each of which has a normally open valve member operatively connected to the rod end of one of the two jacks and a pilot connection with the end of the slave cylinder away from which the slave piston is moved by the master cylinder when said one of the two jacks has fluid pressure applied to its rod end, whereby back pressure on the slave piston operates through the pilot connection to substantially close said normally open valve member and thereby direct substantially the entire flow of fluid to the head end of the other jack.

4. The improvement of claim 3 in which each selector valve also includes a restricted flow valve element through which a small volume of fluid under pressure may pass to the rod end of the associated jack, so that the idle jack assists slightly in articulating the vehicle.

5. The improvement of claim 4 in which each selector valve also includes a normally closed bypass means which is opened by movement of the selector valve from its normal position to connect the rod end of the active jack to the rod end of the idle jack for supplying anti-cavitation fluid behind the piston of said idle jack.

6. The improvement of claim 3 in which each selector valve also includes a normally closed bypass means which is opened by movement of the selector valve from its normal position to connect the rod end of the active jack to the rod end of the idle jack for supplying anti-cavitation fluid behind the piston of said idle jack.

7. The improvement of claim 3 in which each pilot connection is in the hydraulic connection between the slave cylinder and the master cylinder.

8. The improvement of claim 7 in which the hydraulic connection between the master cylinder and the slave cylinder includes flow restricting means, and the pilot connections are between said flow restricting means and the master cylinder.

9. The improvement of claim 2 in which the pilot connection is in the hydraulic connection between the slave cylinder and the master cylinder.

10. The improvement of claim 9 in which the hydraulic connection between the master cylinder and the slave cylinder includes flow restricting means, and the pilot connection is between said flow restricting means and the master cylinder.

11. The improvement of claim 1 in which the selector valve means includes two selector valves each of which has a normally open valve member operatively connected to the rod end of one of the two jacks, and in which there is an operative connection between each of said selector valves and the means for sensing back pressure to close the valve member which is operatively connected to the jack that has its rod end under pressure at the time said back pressure occurs.

12. The improvement of claim 11 in which the means for sensing back pressure has two sensing connections to the slave cylinder, one on each side of the slave piston.

13. The improvement of claim 1 which includes means for admitting fluid to the rod end of the idle jack to avoid cavitation behind the piston of said idle jack.

14. The improvement of claim 13 in which said means for admitting fluid includes normally closed bypass means which is opened to connect the rod end of the active jack to the rod end of the idle jack as the selector valve means moves from its normal position.

* * * * *